July 30, 1968

H. RUBE 3,394,478

SLIDE PROJECTOR

Filed April 26, 1966

INVENTOR
HELMUT RUBE
BY Michael S. Striker
his ATTORNEY

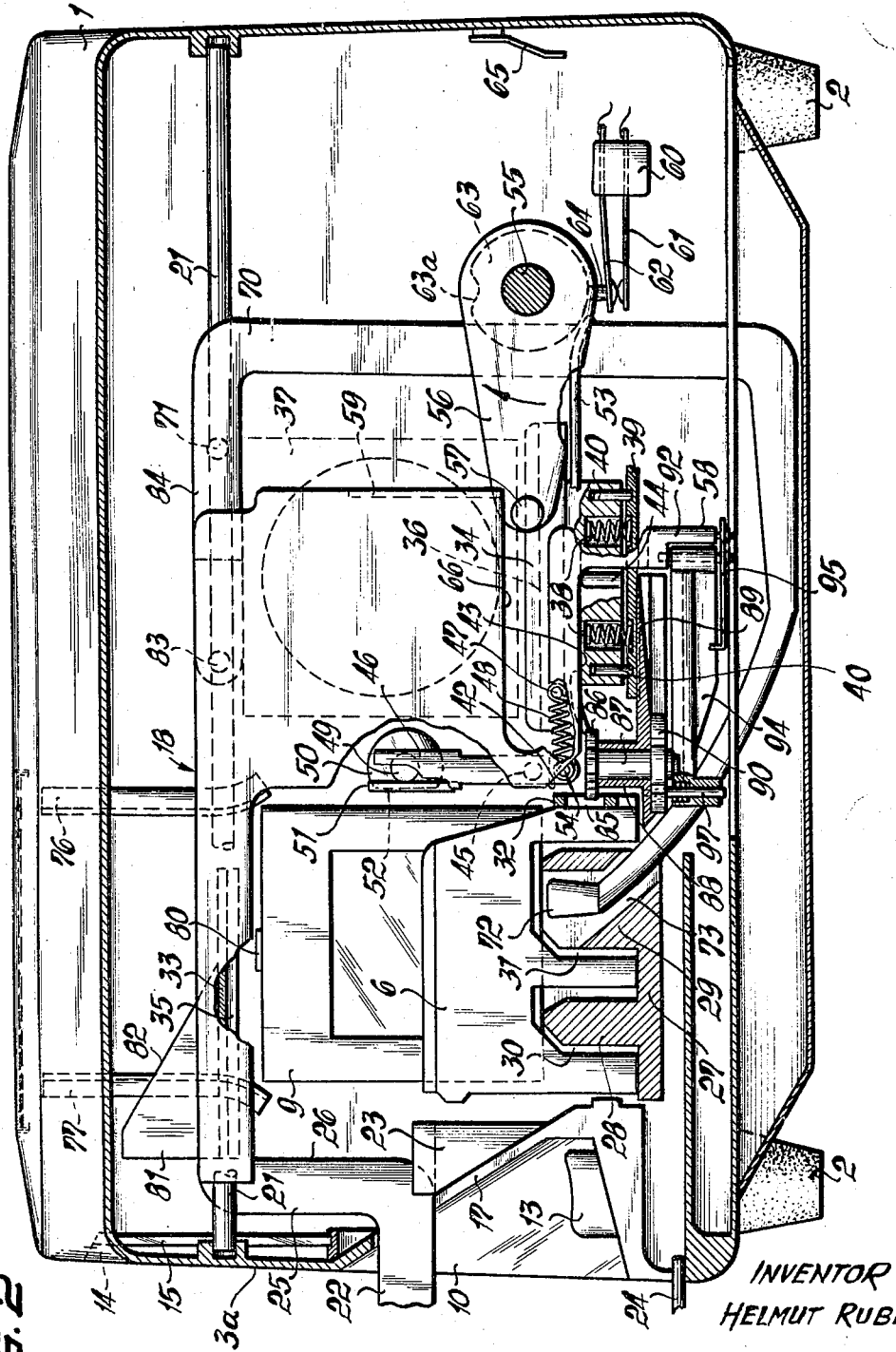

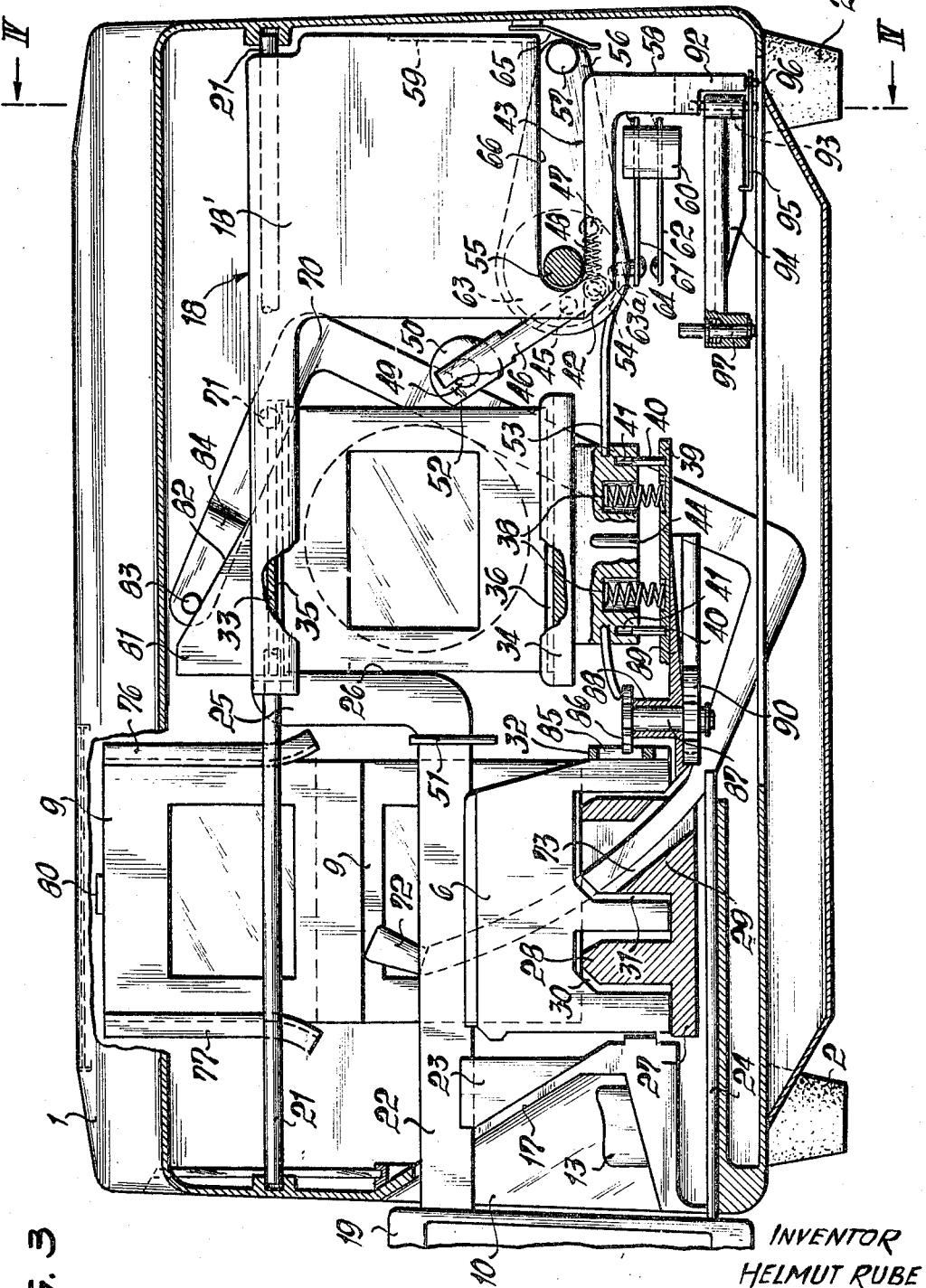

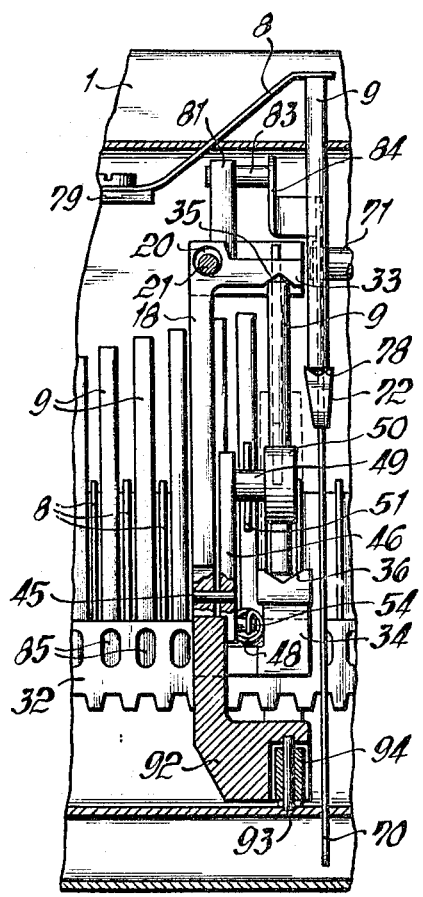

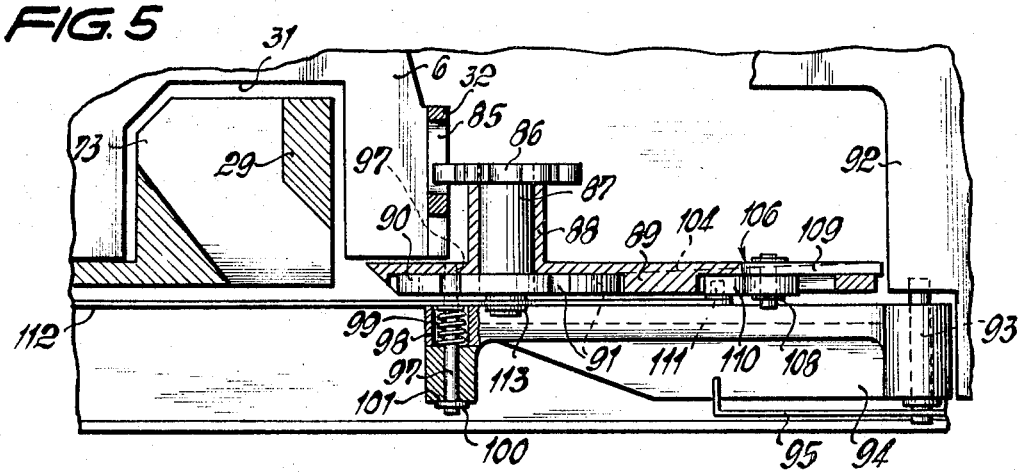
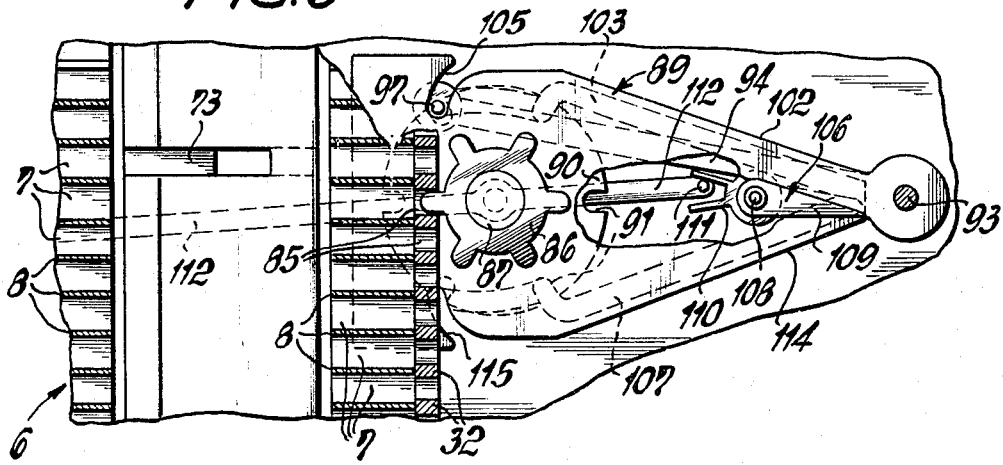
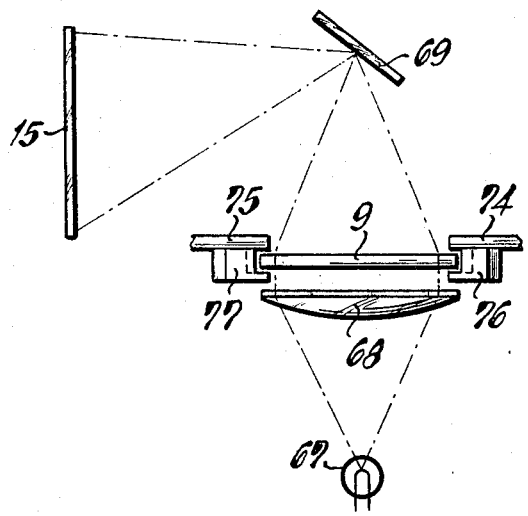

United States Patent Office 3,394,478
Patented July 30, 1968

3,394,478
SLIDE PROJECTOR
Helmut Rube, Endersbach, Germany, assignor to Robert Bosch Elektronik und Photokino G.m.b.H., Stuttgart-Unterturkheim, Germany
Filed Apr. 26, 1966, Ser. No. 545,377
Claims priority, application Germany, Apr. 29, 1965, B 81,662
12 Claims. (Cl. 40—79)

ABSTRACT OF THE DISCLOSURE

A slide projector wherein a first transfer unit transports slides sideways between an intermittently advancing magazine and a projection position and wherein a second transfer unit transports slides up and down between the magazine and a previewer located directly above the magazine. Slides which are transported by the first transfer unit are located outside of the path of the light beam in the previewer, and the second transfer unit receives motion from the first transfer unit.

---

The present invention relates to projectors for slide transparencies, popularly known as slides, and more particularly to slide projectors which are constructed to accommodate or to carry magazines containing a number of slides and to project the images of such slides in sequence. Still more particularly, the invention relates to a slide projector or slide transparency projector which is equipped with a novel and improved slide previewer.

A slide previewer is of considerable assistance to the operator of a slide projector because the operator can glance at a slide before the image of such slide is actually projected onto the screen. This enables the operator to gather his thoughts and to be in a position to properly describe the image which is being projected and/or the event associated with the image. In certain presently known slide projectors with slide previewers, the previewer comprises an illuminated window into which the slides are inserted manually, one-by-one. Such previewers are satisfactory for use in projectors wherein the slides whose images are to be projected must be inserted by hand because the operator simply transfers slides from the previewer window into the projection gate. However, the just described types of slide previewers cannot be used in slide projectors which project images by moving slides from a magazine to the projection gate and back to the magazine. This will be readily understood since, in many presently known projectors, the slides are not accessible to the operator's hand while the magazine containing the slides is properly accommodated in the housing of the projector. Consequently, and if the operator wishes to review the slides which are stored in the magazine, such reviewing can take place only before the slides are inserted into the magazine or by removing the slides from a loaded magazine and by thereupon returning the slides back to their respective compartments in the magazine. Such procedure is cumbersome and time-consuming; furthermore, the operator is unlikely to recall the contents of all slides in a relatively large magazine and, in order to be capable of properly describing the contents of such slides, he must take notes to which he refers during actual projection.

In accordance with another presently known proposal, slides are joined into an elongated band which is led through the projection gate in such a way that each slide passes through a previewer prior to being introduced into the projection gate. The band is advanced in stepwise fashion from a higher level to a lover level in a manner known from projectors for roll film and the slide which is located immediately behind the projected slide can be observed through an auxiliary optical system which forms part of the previewer. Such previewers are quite satisfactory but cannot be used in projectors wherein individual (discrete) slides are stored in a magazine because the slides overlap and, therefore, it would be impossible to have a previewer arrange to permit observation of slides in the magazine proper.

Accordingly, it is an important object of the present invention to provide a slide projector of the type wherein the slides are mounted in a magazine which is advanced through or along the projector housing, and to provide the projector with a slide previewer which enables the operator to automatically move a slide to a position in which the slide can be observed before it reaches the projection gate.

Another object of the invention is to provide a slide projector of the just outlined characteristics wherein the presence of the novel slide previewer does not necessitate any interruptions in normal operation of the projector and wherein the placing of slides into and removal of slides from the previewer takes place in automatic response to transfer of slides between the magazine and the projection gate.

A further object of the invention is to provide a very simple operative connection between the transfer unit which transports slides between the magazine and the projection gate and the transfer unit which transports slides between the magazine and the previewer.

An additional object of the instant invention is to provide a slide previewer which is positioned in such a way that it can be observed only by the operator and which enables an operator to observe a slide which is about to be projected so that the operator must memorize the contents of a previewed slide only for an interval which corresponds to the length of time between two successive projections.

A concomitant object of the invention is to provide a slide previewer which adds little to the bulk of the slide projector.

Briefly stated, one feature of my present invention resides in the provision of a slide projector which comprises a projection gate, a manually operated and/or power-driven first transfer unit for transporting slides between a magazine and the projection gate, advancing means for moving the magazine stepwise with reference to the housing of the projector in response to operation of the first transfer unit, a slide previewer, and a second transfer unit for transporting slides between the magazine and the previewer, the first transfer unit being arranged to transport slides which were returned into the magazine by the second transfer unit. The arrangement is preferably such that the two transfer units transport two immediately adjacent slides, i.e., a slide which has been returned into the magazine from the previewer is thereupon transported into the projection gate.

The two transfer units are preferably positioned with reference to each other in such a way that actuation of the first transfer unit results in actuation of the second transfer unit or vice versa. Also, the advancing means for the magazine may receive motion from the first transfer unit so that the magazine is advanced by a step to place fresh slides into registry with the two transfer units in automatic response to movement of a slide from the projection gate back into the allotted compartment in the magazine.

The novel features which are considered as characteristic of the invention are set forth in particular in the appended claims. The improved slide projector itself, however, both as to its construction and the mode of operating the same, together with additional features and advantages thereof, will be best understood upon perusal of the following detailed description of a specific embodiment with reference to the accompanying drawings, in which:

FIG. 2 is a transverse vertical section through the projector substantially as seen in the direction of arrows from the line II—II of FIG. 1 and illustrates the two transfer units in positions they assume just before they begin to transport a pair of immediately adjacent slides from the magazine;

FIG. 3 is a similar transverse vertical section and illustrates the transfer units in positions they assume prior to returning the slides into the magazine;

FIG. 4 is a section substantially as seen in the direction of arrows from the line IV—IV of FIG. 3;

FIG. 5 is an enlarged fragmentary sectional view of the step-by-step advancing means for the slide magazine;

FIG. 6 is a top plan view of the structure shown in FIG. 5; and

FIG. 7 is a diagrammatic view of the slide previewer.

Figure 1:
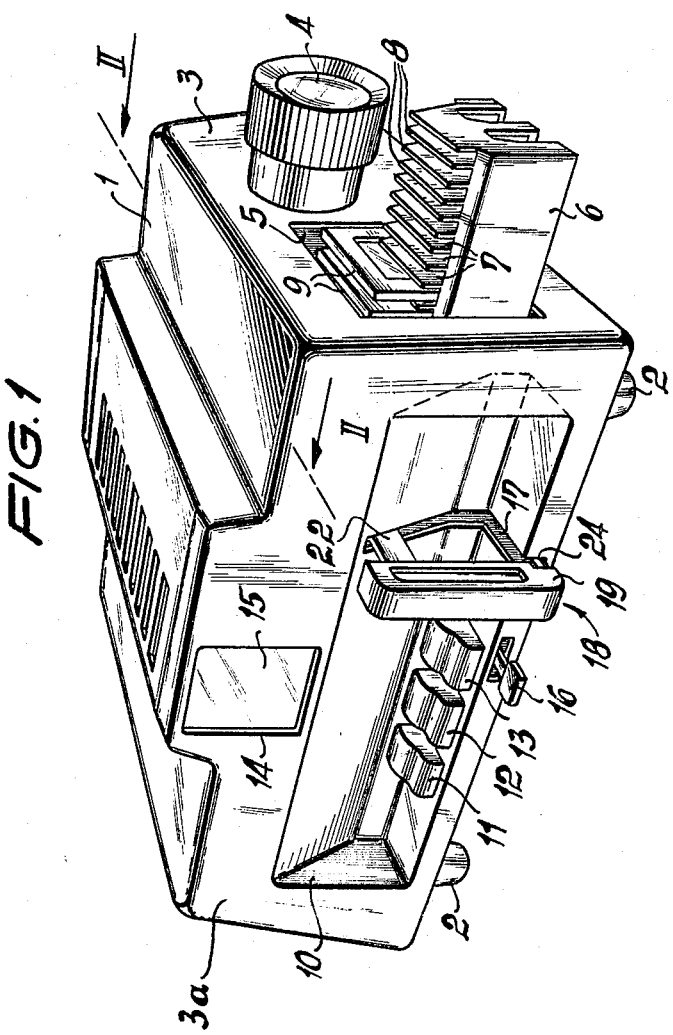
FIG. 1 is a perspective view of a slide projector which embodies my invention.

Referring to the drawings in detail, and first to FIG. 1, there is shown a slide projector which comprises a housing 1 supported by four legs 2 and including a front wall 3 which carries a projector lens 4. The axis of the lens 4 is parallel with a tunnel 5 which extends through the housing 1 and can receive an elongated slide magazine or tray 6. The magazine 6 is insertable from the rear end of the housing 1 and comprises a plurality of relatively low transverse partitions 8 defining between themselves narrow compartments 7 for individual slides 9.

The controls of the projector are located in or adjacent to an elongated recess 10 provided in a side wall 3a of the housing. These controls include three push buttons 11, 12, 13 and a selector member 16 which can adjust the advancing means for the magazine 6 for operation in forward or reverse. The slide previewer of the projector comprises an observation window 14 which is located in the side wall 3a above the recess 10 and contains a frosted screen 15. The push buttons 11–13 control the electric circuitry of the projector by turning on and off the projection lamp (not shown), by turning on and off the fan (not shown) and for starting or arresting the motor which can operate the first transfer unit. The projector further comprises a handle 19 which is adjacent to a slot 17 in the side wall of the housing 1 and can be used to effect manually induced operation of the two transfer units.

The handle 19 is connected with a reciprocable transfer member or pusher 18 which forms part of the first transfer unit and is used to move slides between the magazine 6 and a projection gate 37 shown in FIG. 2. The pusher 18 is provided with a horizontal bore 20 (see FIG. 4) for a guide rod 21 which is affixed to the housing 1 and extends transversely of the tunnel 5, i.e., at right angles to the direction of movement of the magazine 6. In order to be properly held against tilting, the pusher 18 comprises an arm 22 which extends through the slot 17 in the side wall of the housing 1 and which is also guided in the groove of a short guide member 23 shown in FIGS. 2 and 3 directly to the right of the recess 10. A second arm 24 of the pusher 18 is connected with the handle 19 and is guided in a suitable guide channel provided therefor in the housing 1.

The inner end of the arm 22 on the pusher 18 is connected with an upwardly extending crank-shaped intermediate portion 25 having a vertical edge face 26 which effects transfer of slides 9 from the magazine 6 into the projection gate 37. Such transfer takes place while the edge face 26 moves from the position shown in FIG. 2 to the position of FIG. 3.

The lower part of the tunnel 5 is bounded by a bottom wall 27 which is provided with two inclined ramps 28, 29 serving to lift that slide which has been moved into registry with the edge face 26. Each of these ramps 28, 29 slopes downwardly at two opposite sides and each thereof extends into a complementary channel 30, 31 provided at the underside of the magazine 6 so that the ramps may engage the lower edge faces on the frames of slides 9. The purpose of the ramps 28, 29 is to raise the slides above the level of a side wall 32 on the magazine 6 so that the slides are then free to travel with the pusher 18 and to bypass the side wall 32 while moving toward the projection gate 37.

As shown in FIGS. 2 to 4, the pusher 18 is provided with a clamping rail 33 cooperating with a clamping rail 34 mounted in the housing 1 to grip that slide 9 which has been transferred into the projection gate 37. The rails 33, 34 are respectively provided with substantially V-shaped channels 35, 36 which can receive the upper and lower edge portions of the frame on that slide which is located in the gate 37. In other words, the clamping portions of the rails 33, 34 are roof shaped and such configuration insures that a slide is safely held while it is located behind the projector lens 4, this projector lens being located in front of the gate 37 and in front of the projection lamp. When held between the rails 33, 34, a slide is located in a vertical plane which is normal to the axis of the projector lens 4.

The lower clamping rail 34 is resiliently supported in the housing 1 so that it can move toward and away from the rail 33 on the pusher 18. In the illustrated embodiment, the rail 34 is mounted on two helical expansion springs 38 which permit the rail 34 to move in a vertical plane at right angles to the optical axis. The lowermost convolutions of the springs 38 bear against a fixed bottom plate 39 which carries two guide pins 40 extending into complementary guide bores 41 of the clamping rail 34 to guide the latter during movement under or against the bias of the springs 38.

The rail 34 can descend against the bias of the springs 38 to a level at which its V-shaped channel 36 registers with a slide 9 which has been lifted by the ramps 28, 29 to a level above the side wall 32 of the magazine 6. Such lower end position of the channel 36 is shown in FIG. 2. As the edge face 26 of the pusher moves from the position of FIG. 2 toward the position of FIG. 3, this edge face simply pushes the slide off the ramps 28, 29 and into the channel 36 of the lower clamping rail 34. The means for displacing the rail 34 against the bias of the springs 38 comprises two longitudinally spaced downwardly extending cams 42, 43 provided on the pusher 18 and a stud-shaped follower 44 provided on the clamping rail 34. The latter will be depressed whenever its follower 44 engages with the cam 42 or 43.

As shown in FIGS. 2 and 3, the rightmost part of the pusher 18 is of inverted U-shape and includes the aforementioned intermediate portion 25 as well as an inner end portion 18'. The latter portion 18' carries a pivot pin 45 for a small return lever 46 which serves to move slides from the projection gate 37 into the corresponding compartments 7 of the magazine 6. The return lever 46 is biased by a spring 48 one end of which is attached to a post 47 carried by the pusher 18. The spring 48 biases the lever 46 in a counterclockwise direction as the parts appear in FIGS. 2 and 3 so that a head 50 mounted on a pivot pin 49 carried by the free end of the lever 46 tends to bear against the adjoining vertical edge face on the frame of a slide. The arrangement is such that the head 50 cannot interfere with forward or backward movement of the magazine 6 in its tunnel 5 and, in order to prevent such interference on the part of the head 50, the interior of the housing 1 accommodates a fixed stop 51 which is engaged by the pivot pin 49 as soon as a slide returning from the projection gate 37 is properly accommodated in the magazine 6. The head 50 has a flat facet 52 which is adjacent to the edge face on the frame of a slide in registry with the pusher 18, and this facet 52 makes an acute angle with the edge face of a slide in the projection gate 37 when the return lever 46 assumes the position shown in FIG. 3. When the pusher 18 thereupon returns to the position of FIG. 2 and entrains the lever 46, the facet 52 is caused to move to a position of substantial parallelism with the edge face of the adjoining slide 9. Such movement of the facet 52 from a position of inclination to a position of parallelism with the edge face of the adjoining slide is started when the pusher 18 begins to perform that portion of its movement which is necessary to effect a stepwise advance of the magazine 6 with reference to the housing 1. The housing supports a guide rail 53 which is located to the right of the lower clamping rail 34 (see FIGS. 2 and 3) and cooperates with a pin-shaped follower 54 of the return lever 46. The rail 53 engages the follower 54 while the head 50 transports a slide from the projection gate 37 back into the magazine 6 and releases the follower 54 to permit movement of the facet 52 to a position of parallelism with the edge face on the frame of the freshly returned slide in good time to hold the head 50 from interfering with stepwise advance of the magazine. When the follower 54 moves past the guide rail 53, the spring 48 rocks the lever 46 sufficiently to move the head 50 out of the path of the magazine 6. In the illustrated embodiment, the follower 54 simultaneously serves as an anchoring post for the other end convolution of the spring 48.

The pusher 18 may be reciprocated by hand (through the intermediary of the aforementioned handle 19) or by means of a prime mover which preferably assumes the form of a small electric motor, not shown. For example, the push button 13 may be used to start or arrest the motor which serves to reciprocate the pusher 18 in the following manner: The output shaft 55 of the motor carries a crank arm 56 whose free end carries a crank pin 57. When the shaft 55 is driven, the crank pin 57 engages alternately a vertical edge 58 and a bentover flange 59 of the pusher 18. By bearing against the edge 58, the crank pin 57 will shift the pusher 18 from the position of FIG. 3 to that of FIG. 2. When engaging the flange 59, the crank pin 57 will entrain the pusher 18 from the position of FIG. 2 to that shown in FIG. 3. The shaft 55 rotates in a clockwise direction, as viewed in FIG. 2 or 3, and FIG. 2 shows the crank pin 57 in a position just before this pin engages the flange 59. In FIG. 3, the pin 57 is about to move into motion transmitting engagement with the edge 58.

The electric circuit of the motor which drives the shaft 55 includes a normally open electric switch 60 which comprises two resilient contacts 61, 62. This switch can be closed by a disk-shaped trip 63 on the shaft 55. When the shaft 55 is driven by its motor, the trip 63 normally closes the switch 60 except in one of its angular positions. The periphery of the trip 63 is formed with a notch 63a which can receive a pin 64 mounted on the contact 61 of the switch 60. The latter is open when the pin 64 actually extends into the notch 63a, i.e., the circuit of the motor is then deenergized. A springy brake 65 extends into the path of the crank pin 57 and serves to arrest the crank arm 56 in the angular position of FIG. 3 as soon as the circuit of the motor is deenergized in response to entry of the pin 64 into the notch 63a of the trip 63. In such arrested position, the pin 57 is in registry with a slot 66 machined into the inner end portion 18' of the pusher 18 and serving to allow for manual or motor-induced reciprocation of the pusher. The length of the slot 66 suffices to permit for movement of the pusher 18 from the position of FIG. 2 to that of FIG. 3 or vice versa when the crank pin 57 engages the brake 65 and is thus aligned with the slot 66. The switch 60 is connected in parallel with a second switch (not shown) which can be temporarily closed by the push button 13 so as to start the motor which drives the shaft 55. The push button 13 may be released immediately because the switch 60 closes as soon as the shaft 55 changes the angular position of the trip 63 so that the pin 64 leaves the notch 63a.

The components of the slide previewer are shown in FIG. 7. They include the aforementioned screen 15 which is installed in the window 14 of the side wall 3a, a source 67 of light, a condenser lens 68 located between the source 67 and that slide 9 which has been withdrawn from the magazine 6 and assumes a position in which it can be observed through the window 14, and a deflecting mirror 69 which directs the image of such slide onto the screen 15. The second transfer unit of the projector is arranged to operate in synchronism with the pusher 18 in such a way that it places behind the condenser lens 68 that slide which immediately follows the slide that has been engaged by the edge face 26 of the pusher 18. Return movement of a slide from the previewer is completed before the pusher 18 performs the next forward stroke so that this same previewed slide can be moved into the projection gate 37.

The second transfer unit comprises a substantially sickle-shaped transfer lever 70 (hereinafter called lifter) which is rockable on a fixed pivot pin 71 carried by the housing 1, see FIGS. 2, 3 and 4. One end portion 72 of the lifter 70 resembles a plunger and may be introduced into the magazine 6 from below to engage the lower edge face on the frame of a slide which is located directly behind the slide in registry with the edge face 26 of the pusher 18. The plunger 72 extends upwardly through a cutout 73 in the bottom wall 27 and ramp 29 and, when the lifter 70 is caused to rock from the position of FIG. 2 to that of FIG. 3, the plunger 72 raises the aligned slide 9 to a position directly above the corresponding compartment 7 of the magazine 6 and in front of an opening 75 shown in FIG. 7. This opening 75 is located behind the condenser lens 68 and is provided in an internal panel 74 of the housing 1. The panel 74 supports two vertically extending guide rails 76, 77 which guide the slide 9 during movement toward and away from the position of registry with the condenser lens 68. The distance between the plane of the guide rails 76, 77 and the plane of the edge face 26 equals the distance between two adjoining compartments 7 of the magazine 6.

The top face of the plunger 72 is provided with a V-shaped channel 78 (see FIG. 4) which can receive the lower edge of the frame on that slide which is being moved into or from the guide rails 76, 77.

A bracket 79 which is fixedly mounted in the housing 1 (see FIG. 4) carries a leaf spring 80 which extends midway between the guide rails 76, 77 to serve as an abutment for the upper edge face on the frame of a slide which is in a position to be observed through the screen 15. This spring 80 is deformed and stores energy when the plunger 72 lifts a slide from the magazine 6 and dissipates such energy when the plunger 72 descends to thereby return the slide to the respective compartment 7 of the magazine. In other words, the spring 80 performs in the second transfer unit substantially the same function as the return lever 46 of the first transfer unit.

The means for rocking the lifter 70 from the position of FIG. 2 to that of FIG. 3 comprises a substantially wedge-shaped motion transmitting cam 81 which is provided on the pusher 18 and whose inclined cam face 82 cooperates with a follower pin 83 on the short upper arm 84 of the lifter. The cam face 82 engages the follower pin 83 when the pusher 18 moves from the position of FIG. 2 to that of FIG. 3 whereby the lifter 70 rocks in a clockwise direction, as viewed in FIG. 2 or 3, and its plunger 72 automatically raises the registering slide 9 into the space between the guide rails 76, 77 to deform the spring 80 and to thereby introduce the slide into the previewer.

The side wall 32 of the magazine 6 is provided with a series of openings 85 each of which is aligned with one of the compartments 7. These openings 85 may receive the teeth of a gear 86 which forms part of the advancing means for the magazine 6. The gear 86 is mounted on a shaft 87, see particularly FIGS. 5 and 6, which is rotatable in a sleeve 88 forming part of or connected with a special plate-like guide cam 89. The shaft 87 also carries an indexing wheel 90 whose periphery is provided with six equidistant recesses or notches 91. The indexing wheel 90 is recessed into the guide cam 89.

The pusher 18 comprises an arm 92 (see FIGS. 2–5) which is provided with a pivot pin 93 for an indexing lever 94 adapted to change the angular position of the indexing wheel 90. The lever 94 is biased by the two legs of an elongated dual-action spring 95 which is convoluted around a pin 96 carried by the arm 92 of the pusher 18. The spring 95 tends to maintain the indexing lever 94 in a median or neutral position with reference to the path of movement of the pusher 18. If the lever 94 is rocked to the right or to the left of such neutral position (for reasons which will be explained later), one leg of the spring 95 bears against the pin 93 while the other leg of the spring tends to return the lever 94 to neutral position.

The free end of the indexing lever 94 carries a torque transmitting pin 97 which can enter successive recesses 91 of the indexing wheel 90. The pin 97 is shiftable in a direction at right angles to the plane of movement of the lever 94. The latter is provided with a countersunk bore 98 which accommodates a spring 99 serving to bias the pin 97 upwardly (see FIG. 5), namely, in a direction toward the underside of the indexing wheel 90. When the spring 99 is free to expand, it urges a disk-shaped stop 100 on the lower end portion of the pin 97 against the lower face 101 of the indexing lever 94. This lever is movable in a horizontal plane which is located at a level below the plate-like guide cam 89. The arrangement is such that the path of movement of the lever 94 in response to shifting of the pusher 18 from the position of FIG. 2 to that of FIG. 3 is different from the path of movement when the pusher 18 is moved in the opposite direction, i.e., back to the position of FIG. 2.

Starting from the position of the pusher 18 as shown in FIG. 2, the torque transmitting pin 97 of the indexing lever 94 then abuts against the outer surface portion 102 of the guide cam 89, see FIG. 5. The pin 97 is biased by the spring 95 and, as the pusher 18 begins to move toward the position of FIG. 3, the spring 95 maintains the pin 97 in engagement with the surface portion 102. Once the pin 97 moves beyond the surface portion 102, the spring 95 is free to move the lever 94 back to the aforementioned neutral position.

The underside of the guide cam 89 is formed with a groove or depression 103 which extends to a slot 105 and whose upper boundary is indicated in FIG. 5 by a broken line 104. It will be seen that the line 104 slants upwardly in the direction of movement of the pusher 18 toward the position of FIG. 3. During movement of the pusher 18 back to the position of FIG. 2, the pin 97 is led into the groove 103 by means to be described hereinafter whereby the surface at the top of the groove 103 (see the line 104) displaces the pin 97 against the bias of the spring 99. When the slide which is engaged by the facet 52 of the head 50 on the return lever 46 moves back into the allotted compartment 7 of the magazine 6, the pin 97 enters one of the recesses 91 in the indexing wheel 90, namely, that recess 91 which is adjacent to the groove 103. The pusher 18 then performs an additional movement in a direction to the left, as viewed in FIG. 2 or 3, whereby the pin 97 changes the angular position of the wheel 90 through an angle of about 60 degrees and in a counterclockwise direction, as viewed in FIG. 6, so that the gear 86 (which is compelled to rotate with the wheel 90) advances the magazine 6 by a step to place into registry with the edge face 26 that slide 9 which has been returned from the previewer.

The aforementioned slot 105 in the guide cam 89 enables the spring 99 to expand after the magazine 6 has been advanced by a step so that the pin 97 moves out of the corresponding recess 91 and returns into engagement with the surface portion 102 of the guide cam 89. The cycle is then repeated in the above-described way in that the pin 97 travels along the surface portion 102 and enters the groove 103 when the pusher 18 again moves toward the position of FIG. 2.

In order to make sure that the magazine 6 can be advanced in either direction, namely, toward or away from the front wall 3 of the housing 1, the indexing wheel 90 must be rotatable in a clockwise or in a counterclockwise direction. To this end, the guide 89 is provided with a switching or shifting device 106 which can lead the torque transmitting pin 97 into the aforementioned groove 103 or into a second groove 107 which is mirror symmetrical with reference to the groove 103.

The switching device 106 is mounted on a pin 108 carried by the guide cam 89 and has a projecting tongue 109 and a rocking lever 110 engaged by a stud 111. The latter is mounted on a lever 112 which is supported by an extension 113 of the shaft 87. The free end of the lever 112 carries the aforementioned selector member 16 shown in FIG. 1.

FIG. 6 shows that the guide cam 89 comprises a second external surface portion 114 which is mirror symmetrical with reference to the surface portion 102 and a second slot 115 which is mirror symmetrical with reference to the slot 105. The pin 97 will slide along the surface portion 114 when the pusher 18 moves toward the position of FIG. 3 if the switching device 106 is moved by the selector member 16 to a position in which the pin 97 has been caused to enter the groove 107 instead of entering the groove 103. During return movement of the pusher 18 to the position of FIG. 2, the pin 97 then travels in the groove 107 and causes the indexing wheel 90 to turn in a clockwise direction, as viewed in FIG. 6. The advancing mechanism for the magazine 6 acts not unlike a Geneva movement.

The operation of the slide projector is as follows:

In order to set up the projector, the operator must insert a loaded or partially loaded magazine 6 into the tunnel 5. The magazine is inserted from the rear end of the tunnel 5 and to such an extent that the foremost slide 9 registers with the edge face 26 of the pusher 18 which is then maintained in the normal position shown in FIG. 2. In such normal position of the pusher 18, the edge face 26 is sufficiently spaced from the registering slide that it cannot interfere with insertion of the magazine. The operator also depresses the push buttons 11 and 12 to light up the projector lamp, to start the fan, and to complete the circuit of the light source 67 in the slide previewer. The selector member 16 is held in the position of FIG. 1 so that the switching or shifting device 106 assumes the position shown in FIGS. 5 and 6 whereby the advancing mechanism for the magazine 6 is set for operation in forward direction, i.e., the magazine will be advanced toward the front wall 3 of the housing 1 and will soon emerge from the front end of the tunnel 5.

The operator then simply grasps the handle 19 and shifts the pusher 18 from the position of FIG. 2 to that of FIG. 3. The edge face 26 of the intermediate portion 25 moves against the adjoining edge face on the frame of the registering slide 9 and pushes the slide out of the corresponding compartment 7 and toward the V-shaped channel 36 of the lower clamping rail 34. This will be readily understood since the slide which registers with the edge face 26 was resting on the crests of the ramps 28, 29 so that the lower edge face of its frame has been lifted to a level above the side wall 32 of the magazine 6. While the pusher 18 stays in or leaves the normal position of FIG. 2, its cam 43 depresses the follower stud 44 of the lower clamping rail 34 so that the latter descends against the bias of the springs 38 and maintains its channel 36 in registry with the lower edge on the frame of the slide which is being expelled from the magazine 6. The follower stud 44 is released when the slide enters the projection gate 37 so that the rail 34 then rises and clamps the slide against the upper clamping rail 33. This slide is then received in the channels 35, 36 and is biased by the springs 38 to remain in such position until the operator decides to shift the pusher 18 back to the position of FIG. 2.

During travel of the pusher 18 toward the position of FIG. 3, the inclined face 82 of the motion transmitting cam 83 engages the follower pin 83 on the upper arm 84 of the lifter 70 so that the latter is rocked in a clockwise direction and raises its plunger 72 above the cutout 73 in the bottom wall 27 whereby the V-shaped channel 78 of the plunger receives the lower edge portion on the frame of that slide which is located directly behind the slide registering with the edge face 26 on the pusher 18. The plunger 72 rises sufficiently to raise the slide into the space between the guide rails 76, 77 and the slide simultaneously deforms the leaf spring 80 so that the latter assumes the position shown in FIG. 4. Since the source 67 of the slide previewer emits light which passes through the condenser lens 68 and the thus raised slide 9, the image of this slide will be observable on the screen 15. In other words, one of the slides is accommodated in the previewer while the preceding slide extends across the optical axis and has its image focussed on the screen by the lens 4. This means that the person in charge can glance at the image on the screen 15 while discussing the projected image. An experienced person will immediately recall the circumstances under which a certain picture was taken, as long as he is given a chance to have a single quick look at the image before the respective slide is actually projected onto the screen.

If the operator then decides to project the image of the next slide, he simply shifts the handle 19 (and hence the pusher 18) in a direction to the left, as viewed in FIG. 3, and back to the position of FIG. 2. During such movement of the pusher 18, the head 50 on the return lever 46 expels the slide from the projection gate 37 whereby the follower 54 of the lever 46 travels along the guide rail 53. Shortly before the slide which is being returned from the projection gate 37 moves beyond the spring-biased lower clamping rail 34, the inclined cam 42 engages the follower stud 44 of the rail 34 and depresses this rail against the bias of the springs 38, i.e., back to the position shown in FIG. 2, so that the channel 36 of the rail 34 is flush with the crests of ramps 28, 29. The rail 34 is thereupon held in depressed position by the cam 43 of the pusher 18.

When the head 50 has completed the transfer of the slide back into the corresponding compartment 7, its pivot pin 49 strikes against the fixed stop 51. At the same time, the follower 54 leaves the guide rail 53 so that spring 48 can rock the return lever 46 from the angular position shown in FIG. 3 to the angular position of FIG. 2 in which the facet 52 of the head 50 moves into a substantially vertical plane and is sufficiently spaced from the magazine 6 to permit unobstructed operation of the advancing mechanism. In other words, the purpose of the lever 46 and spring 48 is to rock the head 50 out of the way while the pusher 18 performs the last stage of its movement toward the position of FIG. 2, namely, a stage which follows the movement necessary to properly return a slide from the projection gate 37 into the magazine.

Also, while the pusher 18 moves from the position of FIG. 3 toward the position of FIG. 2, its cam 81 moves away from the follower pin 83 and releases the lifter 70 so that the latter rocks by gravity, under the weight of the slide located between the guide rails 76, 77, and under the bias of the leaf spring 80. This insures that the slide which was held in the previewer automatically descends and reenters the allotted compartment of the magazine 6 before the pusher 18 begins the last stage of its return movement, i.e., before the advancing mechanism can shift the magazine by a step.

The torque transmitting pin 97 of the advancing mechanism moves to the right and beyond the guide cam 89 when the pusher 18 assumes the end position shown in FIG. 3. Consequently, the dual-action spring 95 is free to move the indexing lever 94 to neutral position. As the pusher 18 thereupon moves back toward the position of FIG. 2, the switching device 106 directs the pin 97 into the groove 103 of the guide cam 89 so that the pin 97 is depressed by the top surface in the groove 103 and ultimately enters one of the recesses 91 to turn the indexing wheel 90 in a counterclockwise direction, as viewed in FIG. 6. The angular displacement of the indexing wheel 90 suffices to turn the gear 86 through sixty degrees whereby the gear advances the magazine 6 by a step and places into registry with the edge face 26 of the pusher 18 that slide which was allowed to return from the previewer. It is to be noted that the pin 97 remains in the groove 103 while the pusher 18 transports a slide from the projection gate 37 back into the magazine 6, and that the indexing operation (i.e., entry of the pin 97 into a recess 91 of the wheel 90) begins only when the slide has returned into the respective compartment and the head 50 is moved away so that it cannot interfere with forward movement of the magazine. Once the indexing operation is completed, the pin 97 reaches the slot 105 of the guide cam 89 and the spring 99 is free to expand so that the pin 97 engages the surface portion 102 and is ready to slide therealong in response to next movement of the pusher 18 toward the position of FIG. 3. As stated hereinabove, the spring 95 causes the pin 97 to bear against the surface portion 102 and automatically returns the indexing lever 94 to neutral position when the pusher 18 reaches the position of FIG. 3 in which the pin 97 has moved beyond the guide cam 89 and is ready to reenter the groove 103.

If the magazine is to be moved in reverse, the operator simply shifts the selector member 16 so that the lever 112, acting upon the switching device 106 with its stud 111, changes the angular position of the tongue 109 so that the switching device directs the pin 97 into the groove 107 of the guide cam 89. The tongue 109 then seals the entrance to the right-hand end of the groove 103 so that, while the pusher 18 moves back toward the position of FIG. 2, the pin 97 is automatically compelled to enter the groove 107 and to ultimately turn the indexing wheel 90 in a clockwise direction, as viewed in FIG. 6, which results in rearward displacement of the magazine 6. During next movement of the pusher 18 toward the position of FIG. 3, the pin 97 first enters the slot 115 and thereupon slides along the surface portion 114 to advance beyond the right hand end of the cam 89 and to thereupon enter the groove 103 or 107, depending on the setting of the switching device 106. Of course, the reverse operation is much less frequent than the forward operation and, therefore, the operator will disregard the previewer whenever the magazine is being moved in reverse.

Instead of manipulating the handle 19, the operator can decide to start the motor for the output shaft 55 by shortly depressing the push button 13. This completes the circuit of the motor so that the latter changes the angular position of the shaft 55 and trip 63 to close the normally open switch 60. The crank arm 56 performs a full revolution to return a freshly projected slide into the magazine 6 and to advance the next (previewed) slide into the projection gate 37. The pin 64 of the contact 61 then reenters the notch 63a of the trip 63 and the motor comes to a halt in a position when the image of the slide in the gate 37 is being projected onto the screen. In order to start the motor anew, the operator again depresses the push button 13 and the same operation is repeated in the just outlined sequence. When the pin 64 enters the notch 63a, the crank pin 57 is in line with the slot 66 of the pusher 18 so that the latter can be shifted by the handle 19. The pin 57 is arrested in such position by the brake 65 shown in FIGS. 2 and 3. If the pusher 18 is shifted by means of its motor, the latter rotates the shaft 55 in a clockwise direction, as viewed in FIGS. 2 and 3 so that, and starting from the position of FIG. 3, the crank pin 57 overcomes the brake 65 and engages the vertical edge 58 to shift the pusher to the left. During the second half of its revolution, the pin 57 engages the flange 59 and entrains the pusher 18 back to the position of FIG. 3.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a slide projector, a combination comprising a first transfer unit for transporting slides between a magazine and a projection position along a first path; advancing means for moving the magazine stepwise; a slide previewer having means for directing a beam of light in a predetermined direction; and a second transfer unit for transporting slides between the magazine and said previewer along a second path, said previewer being so positioned that slides travelling along said first path are located outside of said beam of light.

2. A combination as defined in claim 1, wherein said second path is substantially normal to said first path.

3. A combination as defined in claim 1, wherein at least one of said paths is a substantially straight path.

4. A combination as defined in claim 1, wherein said first transfer unit is arranged to transport slides laterally of the magazine and said second transfer unit is arranged to transport slides upwardly toward and downwardly away from said previewer.

5. A combination as defined in claim 1, further comprising an operative connection between said transfer units for actuating one of said units in synchronism with the other unit in response to actuation of said other unit.

6. A combination as defined in claim 5, wherein said operative connection comprises motion transmitting cam means provided on said other unit and follower means provided on said one unit and arranged to track said cam means.

7. A combination as defined in claim 6, wherein said other unit is said first transfer unit.

8. A combination as defined in claim 1, wherein said first transfer unit comprises a first transfer member reciprocable in a direction at right angles to the direction of movement of the magazine to transport slides along said first path and said second transfer unit comprises a second transfer member pivotable about a fixed axis to move slides along said second path, and further comprising an operative connection between said units for effecting synchronous movements of said transfer members, said connection comprising a cam provided on one of said transfer members and a follower provided on the other transfer member and tracking said cam at least during a portion of movement of said one transfer member.

9. A combination as defined in claim 8, further comprising apertured guide means for the magazine, said second transfer member having a portion arranged to extend from below through and beyond said guide means to thereby lift a slide out of the magazine and into said previewer.

10. A combination as defined in claim 1, wherein said previewer is located at a level directly above the magazine.

11. A combination as defined in claim 10, wherein said previewer comprises a pair of substantially upright guide members arranged to engage the lateral edges of a slide frame and further comprising a projection gate arranged to accommodate slides in said projection position thereof, said guide members and said gate being disposed in two parallel substantially vertical planes spaced from each other by a distance equaling that between two adjoining slides in the magazine.

12. A combination as defined in claim 11, wherein said guide members define between themselves an opening which accommodates a slide upon actuation of said second transfer unit, said previewer further comprising biasing means normally extending into said opening to store energy in response to engagement with a slide in said opening and to thereby bias such slide against a portion of said second transfer unit.

References Cited
UNITED STATES PATENTS

| | | | |
|---|---|---|---|
| 2,986,069 | 5/1961 | Herrmann et al. | 40—79 XR |
| 3,125,820 | 3/1964 | Maiershofer | 40—79 |
| 3,171,222 | 3/1965 | Sakaki et al. | 40—79 |
| 3,174,395 | 3/1965 | Krull | 40—79 XR |

EUGENE R. CAPOZIO, *Primary Examiner.*

W. H. GRIEB, *Assistant Examiner.*